(12) United States Patent
Sugitani

(10) Patent No.: US 7,552,795 B2
(45) Date of Patent: Jun. 30, 2009

(54) STEERING APPARATUS FOR VEHICLE

(75) Inventor: Nobuo Sugitani, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 430 days.

(21) Appl. No.: 11/279,181

(22) Filed: Apr. 10, 2006

(65) Prior Publication Data

US 2006/0234537 A1 Oct. 19, 2006

(30) Foreign Application Priority Data

Apr. 13, 2005 (JP) ............... 2005-115545

(51) Int. Cl.
*H01R 3/00* (2006.01)
(52) U.S. Cl. ............... 180/446; 180/402; 180/403; 180/443; 180/444
(58) Field of Classification Search .......... 180/402, 180/403, 443, 444, 446
See application file for complete search history.

(56) References Cited

U.S. PATENT DOCUMENTS 7,234,563 B2 * 6/2007 Ogawa et al. ............... 180/402

2003/0114970 A1 * 6/2003 Hara ............... 701/41

FOREIGN PATENT DOCUMENTS

| JP | 2005-029016 | 2/2005 |
| JP | 2005029016 A * | 2/2005 |

* cited by examiner

*Primary Examiner*—Paul N Dickson
*Assistant Examiner*—Jacob Knutson
(74) *Attorney, Agent, or Firm*—Rankin, Hill & Clark LLP

(57) ABSTRACT

A steering apparatus for a vehicle, includes: an operation unit; an input operation magnitude measuring unit; a turning actuator turning steerable wheels; a reaction force actuator; a turning actuator control unit; a reaction force actuator control unit; a planetary gear unit disposed between the operation unit and the turning actuator; a locking element fixing and releasing a component of the planetary gear unit; a locking element operation unit; a locking state detection unit; and a control unit executing at least one of the control operations for increasing magnitude of a control parameter for the turning actuator and for increasing magnitude of a control parameter for the reaction force actuator if it is determined by the locking state detection unit that the locking element is placed in a locked state even though the locking element operation unit is operated so as to place the locking element in the locked state from an unlocked state.

3 Claims, 6 Drawing Sheets

STEERING APPARATUS FOR VEHICLE

BACKGROUND OF THE INVENTION

1. Field of the Invention

The present invention relates to a steering apparatus for a vehicle, in which an operation unit that is operated by a driver and a turning actuator for turning steerable wheels are made mechanically connected or and disconnected.

Priority is claimed on Japanese Patent Applications No. 2005-115545, filed Apr. 13, 2005, the contents of which are incorporated herein by reference.

2. Description of the Related Art

A steer-by-wire steering apparatus, in which a steering wheel (an operation unit) that is operated by a driver and steerable wheels are not mechanically connected, typically includes a reaction force actuator that applies an appropriate reaction force to a driver when the driver operates a steering wheel, and a turning actuator for turning steerable wheels in response to the operation of the steering wheel applied by the driver, and these actuators are independently controlled.

Some of the abovementioned steer-by-wire steering apparatuses include a buckup system in order to ensure steering and turning operations even when a failure occurs in the steering system.

As such a buckup system, a device is known in which a rotation shaft of a steering wheel and an input shaft of a turning mechanism are connected via a planetary gear unit, and one of the gears of the planetary gear unit is selectively made unrotatable using a locking element (see, for example, Japanese Unexamined Patent Application, First Publication No. 2005-29016).

In this buckup system, the steering wheel and the input shaft of the turning mechanism are mechanically disconnected in a normal state by allowing all of the gears of the planetary gear unit to freely rotate so that the steering apparatus functions as a steer-by-wire system, whereas in an abnormal state, the steering wheel and the input shaft of the turning mechanism are mechanically connected by not allowing one of the gears of the planetary gear unit to rotate by locking the gear using the locking element, so that the steering apparatus functions as a steering apparatus in which the steerable wheels can be directly operated and turned by the steering wheel (i.e., functions as a non-steer-by-wire system). Moreover, in this buckup system, the locking element is also operated even when a system failure occurs.

However, there may be a case in which an unlocking operation of the locking element cannot be carried out due to a torsional load that is caused by a torsional phase difference between the steering wheel and the steerable wheels due to the driver's effort applied to the steering wheel in one rotational direction during the unlocking operation of the locking element. In particular, such an unlocking operation tends to be blocked by a great torsional force due to the driver's effort applied to the steering wheel and due to a great load applied to the steerable wheel side of the planetary unit because the steerable wheels are fixed at starting-up of the steering apparatus. If a control operation for a steer-by-wire system is applied to the steering apparatus while the unlocking element is not unlocked in such a case, the driver may feel unusual sensations because the operation of the steering mechanism is restricted by the steering wheel.

SUMMARY OF THE INVENTION

In view of the above circumstances, an object of the present invention is to provide a steering apparatus for a vehicle, in which mechanical disconnection between an operation unit and steerable wheels is ensured at starting-up of the steering apparatus.

In order to achieve the above object, the present invention provides a steering apparatus for a vehicle, including: an operation unit operated by a driver; an input operation magnitude measuring unit measuring magnitude of an input operation applied to the operation unit; a turning actuator turning steerable wheels; a reaction force actuator applying a reaction force to the operation unit; a turning actuator control unit controlling the turning actuator depending on the magnitude of the input operation measured by the operation magnitude measuring unit; a reaction force actuator control unit controlling the reaction force actuator; a planetary gear unit disposed between the operation unit and the turning actuator; a locking element fixing, in a locked state, a component of the planetary gear unit so as to mechanically connect the operation unit and the steerable wheels, and making, in an unlocked state, the component rotatable so as to mechanically disconnect the operation unit from the steerable wheels; a locking element operation unit operating the locking element; a locking state detection unit detecting whether the locking element is placed in the locked state or in the unlocked state; and a control unit executing at least one of a control operation for increasing magnitude of a control parameter for the turning actuator and a control operation for increasing magnitude of a control parameter for the reaction force actuator if it is determined by the locking state detection unit that the locking element is placed in the locked state even though the locking element operation unit is operated so as to place the locking element in the locked state from the unlocked state.

If the locking element is held in the locked state even though the locking element operation unit is operated so as to place the locking element in the locked state from the unlocked state, a torsional load should have been created between the operation unit and the steerable wheels. In this case, the torsional load can be reduced by increasing the magnitude of the control parameter for the turning actuator or the magnitude of the control parameter for the reaction force actuator. As a result, the operation of the locking element from the locked state to the unlocked state is ensured.

Note that the magnitude of the input operation applied to the operation unit may be magnitude of operation angle, magnitude of operation torque (magnitude of steering torque), or the like.

In the above steering apparatus for a vehicle, when the magnitude of the control parameter for the turning actuator is increased, or when the magnitude of the control parameter for the reaction force actuator is increased, a ratio of the magnitude of the control parameter for the turning actuator or for the reaction force actuator with respect to the magnitude of the input operation may be maintained constant until the operation unit returns to a neutral position. In addition, when the magnitude of the control parameter for the turning actuator and the magnitude of the control parameter for the reaction force actuator are simultaneously increased, a ratio of the magnitude of the control parameter for the turning actuator with respect to the magnitude of the input operation and a ratio of the magnitude of the control parameter for the reaction force actuator with respect to the magnitude of the input operation may be maintained constant until the operation unit returns to a neutral position.

With this construction, a rapid change in the magnitude of the control parameter can be prevented when the locking element is operated into the unlocked state from the locked state.

According to the present invention, because the operation of the locking element from the locked state to the unlocked state is ensured by increasing the magnitude of the control parameter for the turning actuator or the magnitude of the control parameter for the reaction force actuator so as to reduce the torsional load between the operation unit and the steerable wheels, a steering control operation in a manner of steer-by-wire can be carried out without imposing unusual sensations to the driver.

Moreover, according to the present invention, because a rapid change in the magnitude of the control parameter can be prevented when the locking element is operated into the unlocked state from the locked state, a steering control operation in a manner of steer-by-wire can be stably carried out without imposing unusual sensations to the driver, and a steering operation feel can be improved.

DESCRIPTION OF THE PREFERRED EMBODIMENTS

An embodiment of a steering apparatus for a vehicle of the present invention will be explained below with reference to FIGS. 1 to 7.

Figure 1:
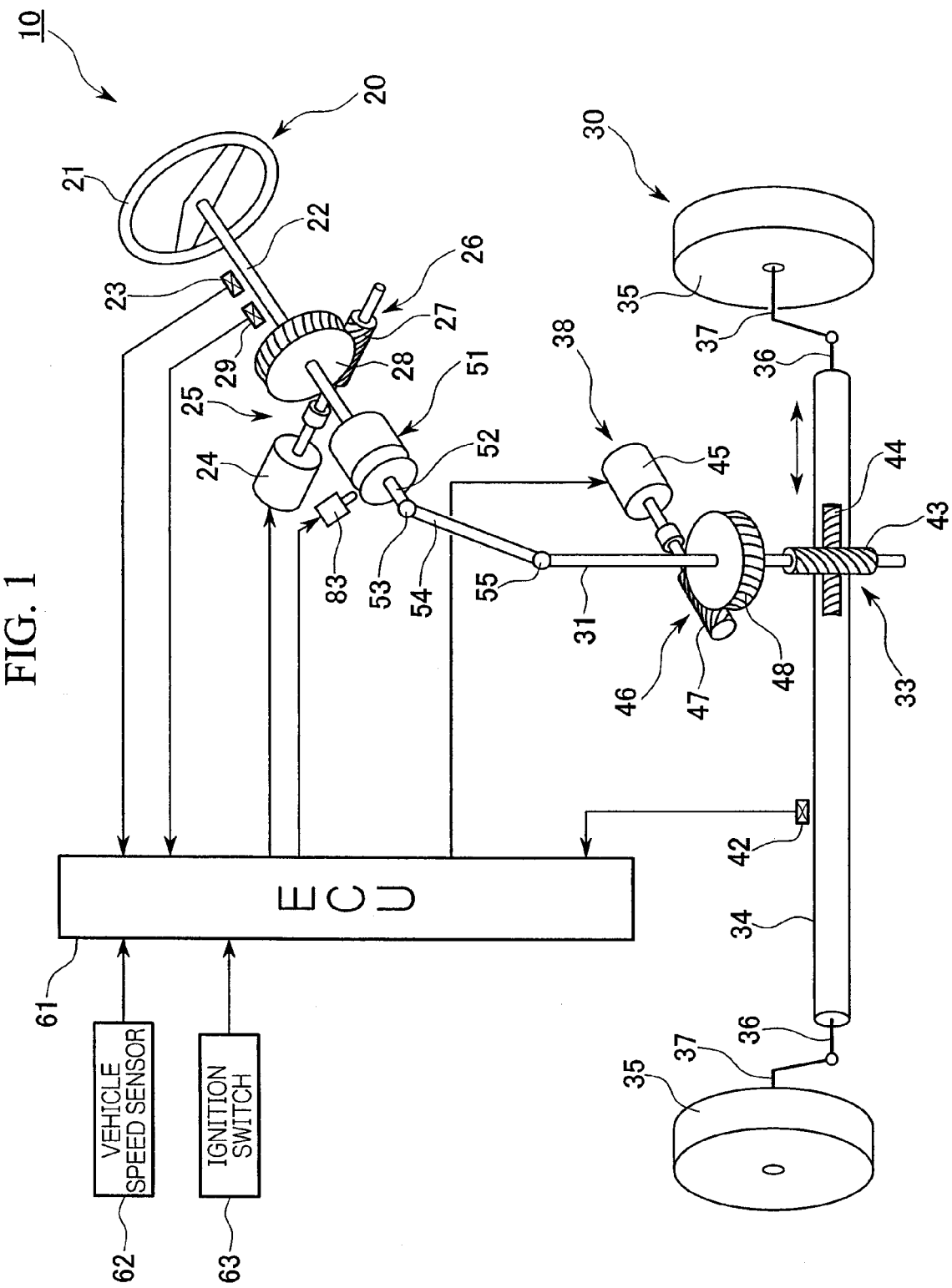
FIG. 1 is a structural diagram of a steering apparatus for a vehicle according to an embodiment of the present invention.

As shown in FIG. 1, a steering apparatus 10 is a so-called steer-by-wire steering apparatus in which a turning mechanism 30 is mechanically disconnected from a steering wheel 21, a turning actuator 38 generates steering power depending on the magnitude of steering operation of the steering wheel 21, the steering power is transmitted to the turning mechanism 30, and the turning mechanism 30 turns right and left steerable wheels 35.

The steering apparatus 10 includes a steering mechanism 20 that includes the steering wheel 21 (an operation unit) operated by a driver, a steering shaft 22 connected to the steering wheel 21, a steering angle sensor 23 (an input operation magnitude measuring unit) for measuring steering angle (magnitude of an input operation) applied to the steering wheel 21, a reaction force actuator 25 for applying a steering reaction force to the steering wheel 21, and a steering torque sensor 29 for measuring steering torque applied to the steering shaft 22. The steering reaction force is defined as operational resistance that is applied to the steering wheel 21 in a direction opposite to the direction of rotation of the steering wheel 21. The reaction force actuator 25 includes a reaction force motor 24 for generating the steering reaction force (reaction torque), and a reaction force transmission mechanism 26 for transmitting the steering reaction force to the steering shaft 22. The reaction force transmission mechanism 26 includes a worm gear unit, i.e., a force amplifying mechanism, having a worm 27 mounted on a motor shaft of the reaction force motor 24, and a worm wheel 28 mounted on the steering shaft 22 and engaging the worm 27.

The turning mechanism 30 includes an input shaft 31 to which a steering effort is input from the steering shaft 22, a rack rod 34 connected to the input shaft 31 via a rack and pinion unit 33, tie rods 36 and knuckles 37 for respectively connecting right and left steerable wheels 35 (e.g., front wheels) to the right and left ends of the rack rod 34, a turning actuator 38 for applying steering power to the input shaft 31, and a rack rod position sensor 42 for measuring position of the rack rod 34. The rack and pinion unit 33 includes a pinion 43 formed on the input shaft 31, and a rack 44 formed on the rack rod 34. The turning actuator 38 includes a steering motor 45 for generating turning power, and a turning power transmission mechanism 46 for transmitting the turning power to the input shaft 31. The turning power transmission mechanism 46 includes a worm gear unit, i.e., a force amplifying mechanism, having a worm 47 mounted on a motor shaft of the steering motor 45, and a worm wheel 48 mounted on the input shaft 31 and engaging the worm 47.

In addition, in the steering apparatus 10, the steering shaft 22 of the steering mechanism 20 and the input shaft 31 of the turning mechanism 30 are connected to each other via a planetary gear unit 51, a first connection shaft 52, a first universal joint 53, a second connection shaft 54, and a second universal joint 55.

The planetary gear unit 51 will be explained below with reference to a schematic diagram shown in FIG. 2. The planetary gear unit 51 includes a sun gear 71 located at the center thereof, plural (e.g., three) planetary gears 72 engaging the sun gear 71, a ring gear 73 with internal teeth engaging the planetary gears 72, and a carrier 74 on which the planetary gears 72 are mounted in a rotatable manner.

The sun gear 71, the ring gear 73, and the carrier 74 are arranged in a coaxial manner in which the first connection shaft 52 is located at the center. The ring gear 73 is connected to the steering shaft 22, the carrier 74 is connected to the first connection shaft 52, the sun gear 71 is supported by the first connection shaft 52 while allowing relative rotation therebetween, and the planetary gears 72 are respectively arranged on the equally spaced radii of the sun gear 71. In FIG. 2, reference numeral 92 indicates a first bearing for supporting the steering shaft 22, reference numeral 93 indicates second bearings for supporting the first connection shaft 52, and reference numeral 94 indicates a third bearing for supporting the ring gear 73.

Figure 3:
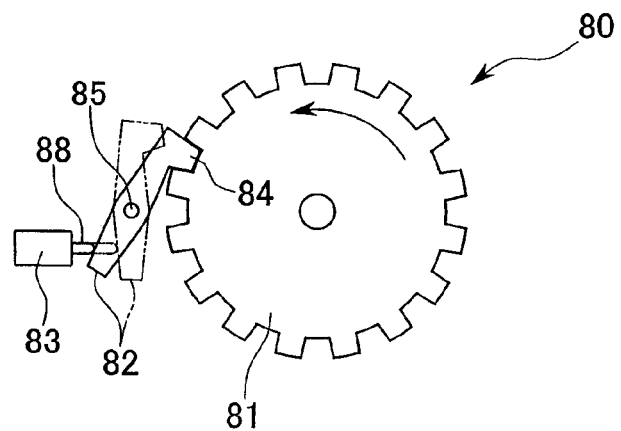
FIG. 3 is a structural diagram showing an example of a locking mechanism included in the steering apparatus for a vehicle according to the embodiment.

Furthermore, the planetary gear unit 51 includes a locking mechanism 80 for selectively blocking the rotation of the sun gear 71. As shown in FIG. 3 in detail, the locking mechanism 80 includes a locking gear 81 integrally formed with the sun gear 71, a swing arm 82 (a locking element) that is engageable with the teeth of the locking gear 81, and a solenoid 83 (a locking element operation unit) for operating the swing arm 82 so that either a locked state or an unlocked state is achieved. The locking gear 81 is arranged in a coaxial manner with the first connection shaft 52 while allowing relative rotation therebetween. The swing arm 82 is made pivotable about a pivot shaft 85, and has, at an end thereof, a locking finger 84 that is engageable with the teeth of the locking gear 81. The swing arm 82 is rotationally biased by a return spring (not shown) so that the locking finger 84 is biased toward the locking gear 81, and an end of a push rod 88 of the solenoid 83 is abutted against the other end of the swing arm 82.

In a non-excited state of the solenoid 83, the push rod 88 is retracted as indicated by a solid line in FIG. 3, and the locking finger 84 of the swing arm 82 engages the teeth of the locking gear 81 because the swing arm 82 is rotated toward the locking gear 81 by the return spring (this state is hereinafter referred to as a locked state). In the locked state, the rotation of the locking gear 81 is blocked, and the sun gear 71 cannot rotate. It should be noted that, the steering apparatus 10 is constituted such that, during a system failure, the solenoid 83 is placed in a non-excited state, and the locking mechanism 80 is placed in the locked state.

Figure 2:
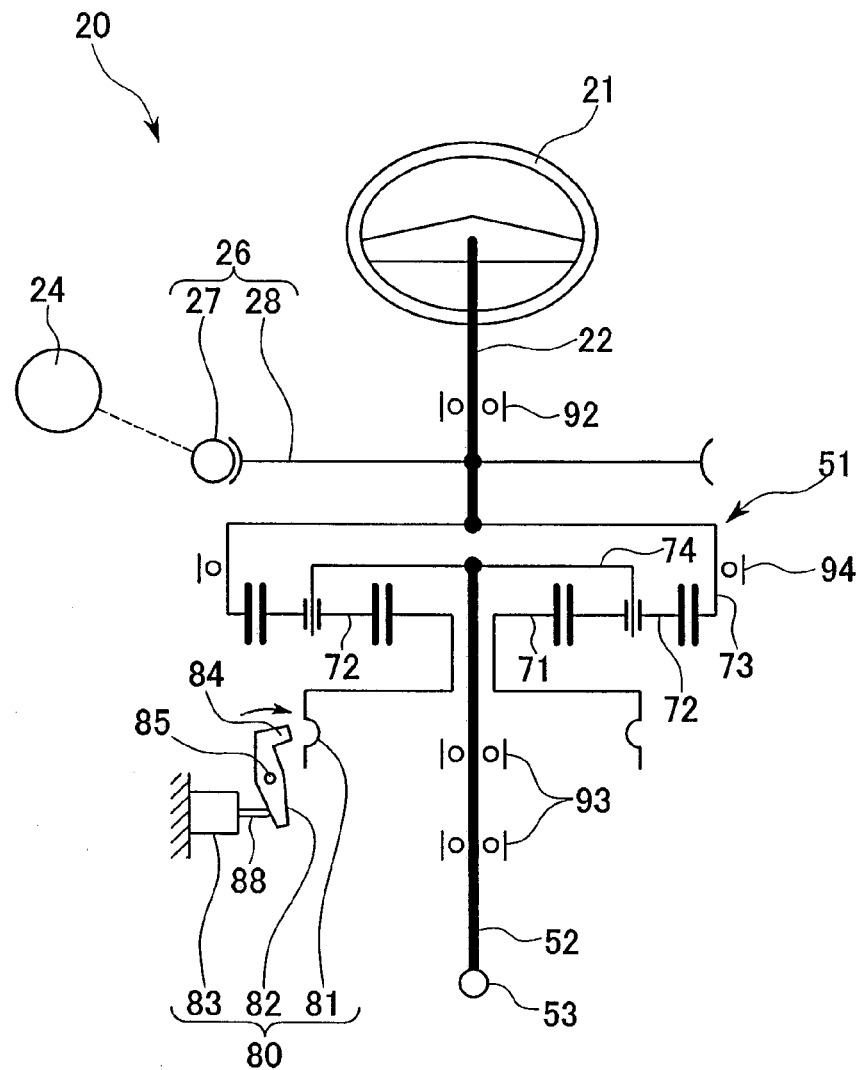
FIG. 2 is a structural diagram showing an example of a planetary gear unit included in the steering apparatus for a vehicle according to the embodiment.

On the other hand, when the solenoid 83 is excited, the push rod 88 projects as shown in FIG. 2 and indicated by a two-dot chain line in FIG. 3, and the other end of the swing arm 82 is pressed by the push rod 88 under effect of elastic force of the return spring. As a result, the swing arm 82 rotates while resisting the elastic force, the locking finger 84 disengages from the locking gear 81, and thus locking is cancelled (this state is hereinafter referred to as an unlocked state).

Next, the operation of the planetary gear unit 51 will be explained below.

When an ignition switch (not shown) is in the ON state, the solenoid 83 is normally excited, and the locking mechanism 80 is placed in the unlocked state. In this state, the locking gear 81 is allowed to rotate, and the sun gear 71 that is integrated with the locking gear 81 is also allowed to rotate. As a result, both the planetary gears 72 and the ring gear 73 are also allowed to rotate without having a mutual interference, and a steering effort is not transmitted from the steering shaft 22 to the input shaft 31. In other words, the steering wheel 21 is substantially disconnected from the steerable wheels 35 by placing the locking mechanism 80 in the unlocked state. In this state, the reaction force motor 24 and the steering motor 45 are independently controlled by an electronic control device 61 as will be explained in more detail below, and the steering apparatus 10 functions as a steer-by-wire steering apparatus.

On the other hand, when the electrical connection between the steering mechanism 20 and the turning mechanism 30 is cancelled due to any causes, or when the ignition switch is turned off, the solenoid 83 is placed in the non-excited state, and the locking mechanism 80 is placed in the locked state. In this state, the locking gear 81 is not allowed to rotate, and the sun gear 71 that is integrated with the locking gear 81 is not allowed to rotate, either. When the steering wheel 21 is rotated in this state so as to rotate the ring gear 73, rotational torque is transmitted to the carrier 74 via the planetary gears 72, the carrier 74 is rotated, and each of the planetary gears 72 rotates on the axis thereof and also rotates around the sun gear 71. In other words, when the locking mechanism 80 is placed in the locked state, the steering mechanism 20 and the turning mechanism 30 are mechanically connected to each other via the planetary gears 72 and the ring gear 73, and the steering wheel 21 can be mechanically connected to the steerable wheels 35. As a result, the rotational motion of the steering wheel 21 can be mechanically converted into the axial motion of the rack rod 34, and the steerable wheels 35 can be turned.

In this state, the steering apparatus 10 does not function as a steer-by-wire steering apparatus, and the steering apparatus 10 functions as a steering apparatus in which the steerable wheels 35 can be manually turned. At this moment, the reaction force motor 24 is controlled by the electronic control device 61 so as not generate a steering reaction force. In this case, a reaction force applied to the steerable wheels 35 from the ground is transmitted to the steering shaft 22 via the turning mechanism 30 and the planetary gear unit 51.

As explained above, when the locking mechanism 80 is placed in the locked state, the steering wheel 21 can be mechanically connected to the steerable wheels 35, and when the locking mechanism 80 is placed in the unlocked state, the steering wheel 21 can be substantially disconnected from the steerable wheels 35.

Next, the control operation for the reaction force motor 24 and steering motor 45 will be explained below. The steering apparatus 10 includes the electronic control device 61 to which output signals from the steering angle sensor 23, the steering torque sensor 29, the rack rod position sensor 42, a vehicle speed sensor 62, and an ignition switch 63 are input. As explained above, when the locking mechanism 80 is placed in the unlocked state so that the steering apparatus 10 functions as a steer-by-wire steering apparatus, the electronic control device 61 independently controls the reaction force motor 24 and the steering motor 45 based on the output signals from the sensors 23, 29, 42, and 62. It should be noted that because the axial position of the rack rod 34 measured by the rack rod position sensor 42 (i.e., stroke of the rack rod 34) corresponds to an actual turned angle, the output signal from the rack rod position sensor 42 is referred to as a signal of the actual turned angle, in the following description.

Figure 4:
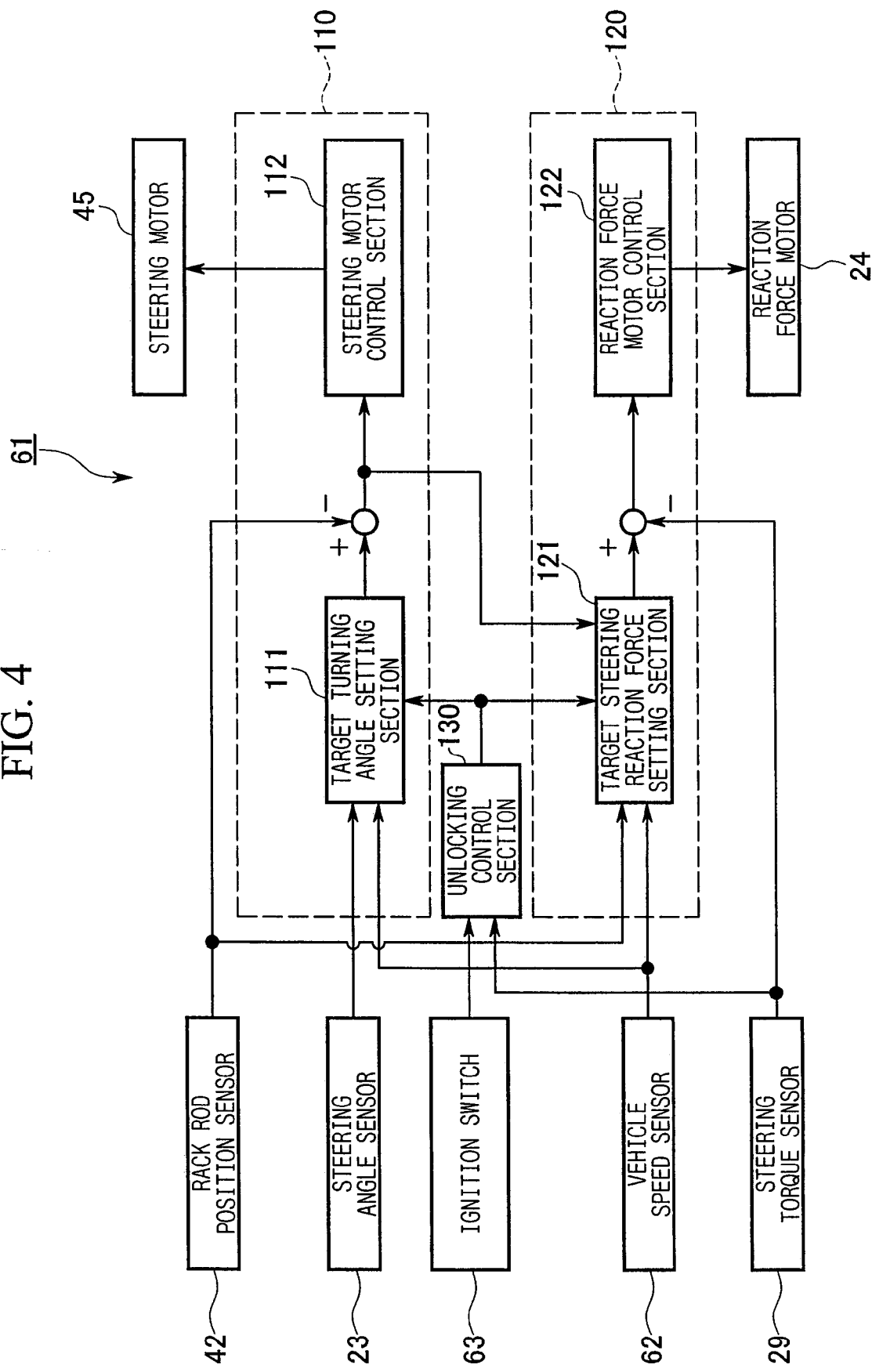
FIG. 4 is a control block diagram of the steering apparatus for a vehicle according to the embodiment.

As shown in the block diagram shown in FIG. 4, the electronic control device 61 includes a turning control section 110 (turning actuator control unit) for controlling the steering motor 45, a reaction force control section 120 (reaction force actuator control unit) for controlling the reaction force motor 24, and an unlocking control section 130 for controlling unlocking of the locking mechanism 80.

The unlocking control section 130 determines whether correction of the control parameters (target turning angle or target steering reaction force) at system starting-up is necessary based on an ON/OFF signal from the ignition switch 63 and the steering torque signal from the steering torque sensor 29, and when it is determined that correction of the control parameters is necessary, the unlocking control section 130 sends correction signals to a target turning angle setting section 111 or to a target steering reaction force setting section 121.

The turning control section 110 includes: a target turning angle setting section 111 for setting a target turning angle based on the steering angle signal including rotational direction of the steering wheel 21 output from the steering angle sensor 23, the vehicle speed signal output from the vehicle speed sensor 62, and the correction signal output from the unlocking control section 130; and a steering motor control section 112 for controlling electric current to be supplied to the steering motor 45 such that the actual turned angle signal output from the rack rod position sensor 42 coincides with the target turning angle set by the target turning angle setting section 111.

According to this construction, an optimal turning angle of the steerable wheels 35 is determined with respect to the steering angle (magnitude of operation) applied by the driver to the steering wheel 21 while taking into account the present vehicle speed.

The reaction force control section 120 includes: a target reaction force setting section 121 for setting a target reaction force based on the actual turned angle signal output from the rack rod position sensor 42, the turning angle command output from the turning control section 110, and the correction signal output from the unlocking control section 130; and a reaction motor control section 122 for controlling electric current to be supplied to the reaction motor 24 such that the output value (i.e., actual steering torque) output from the steering torque sensor 29 coincides with the target reaction force set by the target reaction force setting section 121. It should be noted that the turning angle command output from the turning control section 110 is a deviation signal between the target turning angle output from the target turning angle setting section 111 and the actual turned angle signal output from the rack rod position sensor 42.

According to this construction, a steering reaction force directed in the opposite direction with respect to the direction of rotation in which the driver operates the steering wheel 21 is applied to the steering wheel 21, and a steering feel can be obtained as if there were a torsion bar between the steering wheel 21 and the steerable wheels 35.

Next, a control operation for a case in which it is determined by the unlocking control section 130 that correction of the control parameters is necessary will be explained below.

As explained above, the locking mechanism 80 is placed in the locked state as long as the ignition switch 63 is in the OFF state. When the ignition switch 63 is turned on, the solenoid 83 is excited, the swing arm 82 rotates while resisting the elastic force of the return spring, the locking finger 84 disengages from the locking gear 81 and is unlocked, the locking mechanism 80 is placed in the unlocked state, and thus the steering wheel 21 can be mechanically disconnected from the steerable wheels 35.

However, when the ignition switch 63 is turned on while applying one directional force to the steering wheel 21, the turning mechanism 30 is placed under a great load because the steerable wheels 35 contact the ground without rotation at the moment of turning on the ignition switch 63. Therefore, the turning actuator 38 cannot immediately follow the operation of the steering wheel 21, and there may be a case in which a torsional load is created between the steering shaft 22 and the first connection shaft 52 so that the locking finger 84 is tightly engaged with the locking gear 81, thereby the locking finger 84 cannot be disengaged from the locking gear 81 (i.e., the unlocked state cannot be achieved), and the steering wheel 21 cannot be mechanically disconnected from the steerable wheels 35.

In considering such a situation, in the case of the steering apparatus 10, when the locking mechanism 80 is not placed in the unlocked state from the locked state even though the solenoid 83 is excited by the unlocking command, and a control operation for controlling the magnitude of the control parameter for the turning actuator 38 to be greater than a normal value or a control operation for controlling the magnitude of the control parameter for the reaction force actuator 25 to be greater than a normal value is executed so that the locking finger 84 can be reliably disengaged from the locking gear 81, and thereby the locking mechanism 80 can be reliably placed in the unlocked state from the locked state.

More specifically, when the magnitude of the control parameter for the turning actuator 38 is controlled so as to be greater than the normal value, because a turning power that is greater than a normal value can be obtained, the torsional load created between the steering shaft 22 and the first connection shaft 52 can be reduced, and the locking finger 84 can be reliably disengaged from the teeth of the locking gear 81.

On the other hand, when the magnitude of the control parameter for the reaction force actuator 25 is controlled so as to be greater than the normal value, because the steering reaction force applied to the steering wheel 21 becomes greater than a normal value, the steering torque being applied to the steering shaft 22 can be reduced. As a result, the torsional load created between the steering shaft 22 and the first connection shaft 52 can be reduced, and the locking finger 84 can be reliably disengaged from the teeth of the locking gear 81.

It should be noted that, in this embodiment, whether the locking mechanism 80 has been placed in the unlocked state from the locked state after sending the unlocking command is determined based on the steering torque measured by the steering torque sensor 29 (locking state detection unit). In other words, when the measured steering torque is greater than a predetermined value, it is determined that the locking mechanism 80 has not been placed in the unlocked state, and when the measured steering torque is less than or equal to the predetermined value, it is determined that the locking mechanism 80 has been placed in the unlocked state from the locked state.

Figure 5:
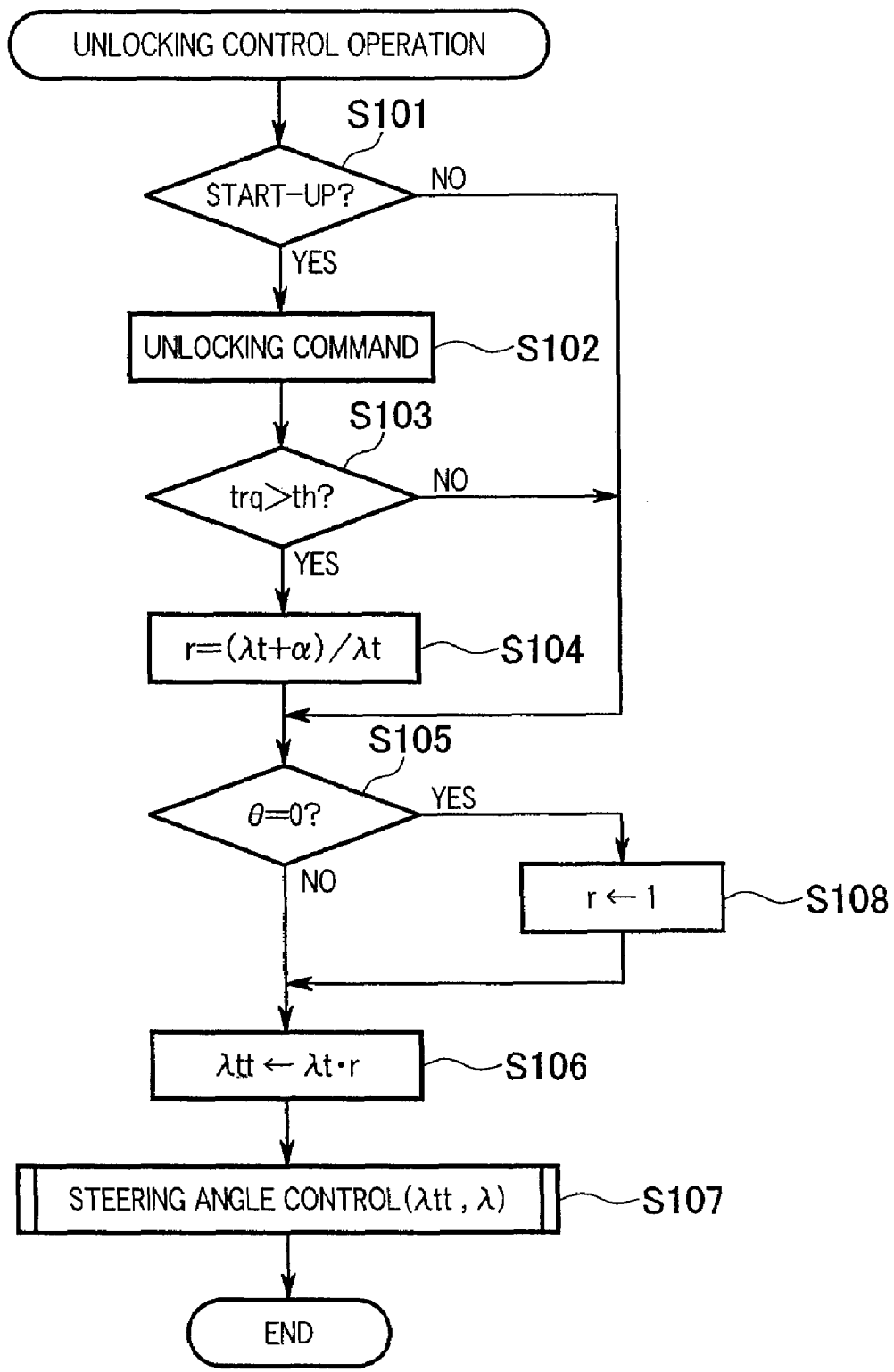
FIG. 5 is an example of a flowchart showing an unlocking operation of the steering apparatus for a vehicle according to the embodiment.
Figure 6:
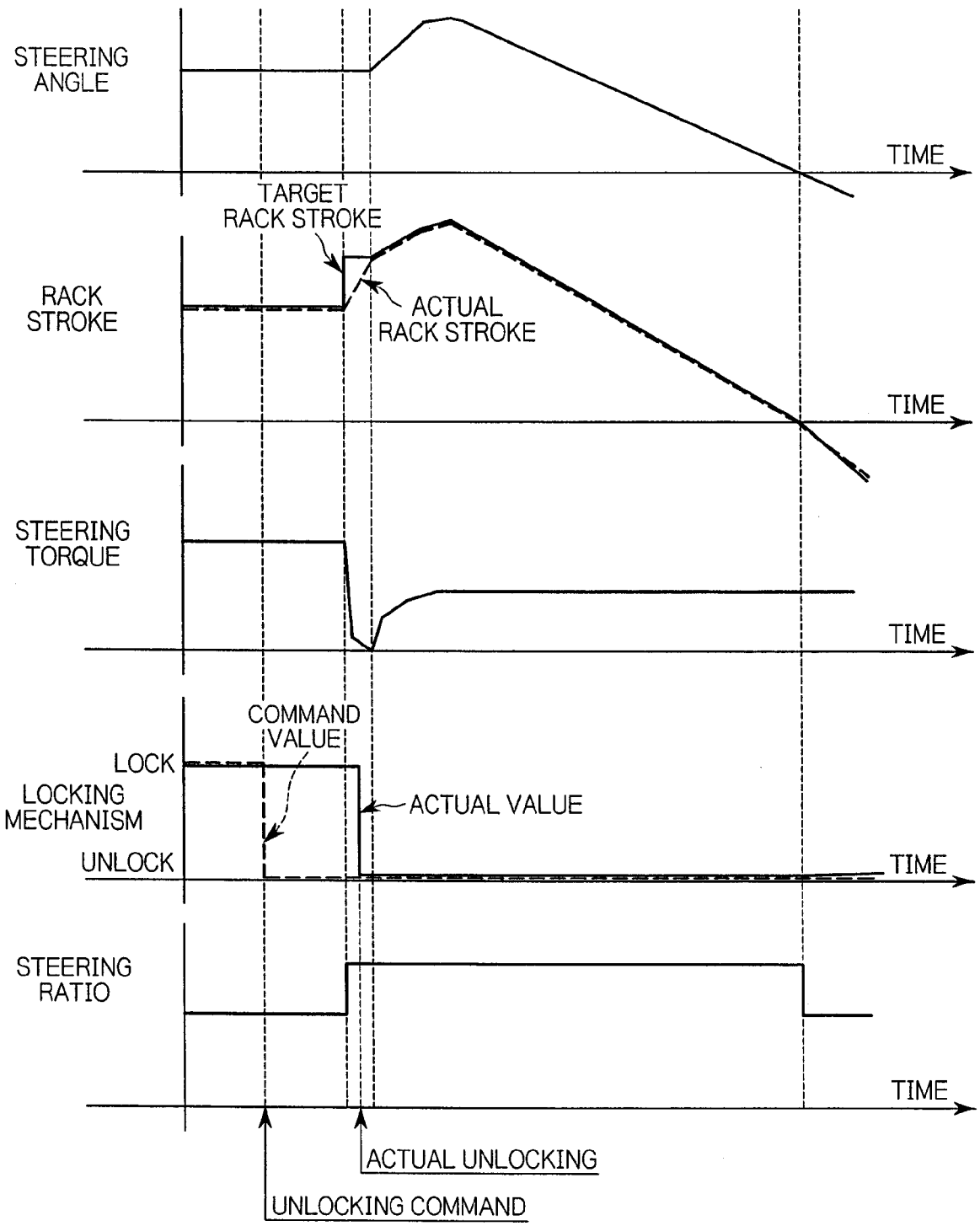
FIG. 6 is an example of a time chart during the unlocking operation of the steering apparatus for a vehicle according to the embodiment.

Next, the unlocking control operation, in which unlocking of the locking mechanism 80 is made easier by controlling the magnitude of the control parameter for the turning actuator 38 to be greater than a normal value, will be explained below with reference to the flowchart shown in FIG. 5 and the time chart shown in FIG. 6. It should be noted that the control routine for the unlocking control operation illustrated in the flowchart shown in FIG. 5 is periodically repeated by the electronic control device 61. Moreover, the rack stroke shown in FIG. 6 corresponds to the turned angle, i.e., the rack stroke may be read as the turned angle.

In step S101, it is determined whether the system is at starting-up based on the output signal from the ignition switch 63.

When the determination result in step S101 is "YES" (i.e., the system is at starting-up), the operation proceeds to step S102, in which an unlocking command is sent out, and electric current is supplied to the solenoid 83 of locking mechanism 80 so that the solenoid 83 is excited.

Next, the operation proceeds to step S1103, in which it is determined whether a steering torque "trq" measured by the steering torque sensor 29 is greater than a predetermined threshold "th" that is determined beforehand. When the steering torque "trq" is greater than the predetermined threshold "th", it is determined that the locking mechanism 80 has not been placed in the unlocked state from the locked state, and when the steering torque "trq" is less or equal to the predetermined threshold "th", it is determined that the locking mechanism 80 has been placed in the unlocked state from the locked state. In this embodiment, the execution of the operation in step S103 by the electronic control device 61 corresponds to the locking state detection unit.

When the determination result in step S103 is "YES" (i.e., trq>th), because the locking mechanism 80 has not been placed in the unlocked state, the operation proceeds to step S104, in which a correction coefficient "r" using Equation (1).

$$r = (\lambda t + \alpha)/\lambda t \qquad \text{Equation (1)}$$

In Equation (1), symbol "λt" is a normal target turning angle that is set when the locking mechanism 80 is placed in the unlocked state based on the steering angle measured by the steering angle sensor 23 and the vehicle speed measured by the vehicle speed sensor 62. Symbol "α", which is a predetermined value determined beforehand, indicates a turning angle that corresponds to an increased magnitude of the control parameter.

Next, the operation proceeds from step S104 to step S105, in which it is determined whether a steering angle θ of the steering wheel 21 measured by the steering angle sensor 23 is "0" (i.e., at a neutral position).

When the determination result in step S105 is "NO" (i.e., θ≠0), the operation proceeds to step S106, in which a corrected target turning angle "λtt" is calculated using Equation (2).

$$\lambda tt = \lambda t \cdot r \qquad \text{Equation (2)}$$

Next, the operation proceeds to step S107, in which electric current supplied to the steering motor 45 is controlled so that an actual turned angle λ measured by the rack rod position sensor 42 coincides with the corrected target turning angle λtt.

On the other hand, when the determination result in step S105 is "YES" (i.e., θ=0), the operation proceeds to step S108, in which the correction coefficient "r" is made to be "1", and then the operation proceeds to step S106.

In other words, when it is determined that the locking mechanism 80 has not been placed in the unlocked state from the locked state even though the solenoid 83 of the locking mechanism 80 is excited at starting-up of the system, a control operation is executed in which the target turning angle is made greater than a normal value. By this operation, as illustrated in the time chart shown in FIG. 6, the steering torque being applied to the first connection shaft 52 can be immediately reduced, and the torsional load created between the steering shaft 22 and the first connection shaft 52 can also be immediately reduced. As a result, the locking finger 84 can be disengaged from the teeth of the locking gear 81, and the locking mechanism 80 is placed in the unlocked state.

The control operation for increasing the target turning angle is maintained even after the locking mechanism 80 is placed in the unlocked state until the steering wheel 21 is placed at the neutral position while maintaining a steering ratio (i.e., a ratio of the control magnitude of the turning angle with respect to the steering angle) that is set at starting of the control operation for increasing the target turning angle. When the steering wheel 21 is placed at the neutral position, the control operation for increasing the target turning angle is ended, and a control operation under a normal steering ratio is resumed.

By this control operation, the locking mechanism 80 is reliably placed in the unlocked state at starting-up of the system, and a steering control operation in a manner of steer-by-wire can be stably carried out without imposing unusual sensations to the driver.

It should be noted that when the determination result in step S101 is "NO" (i.e., the system is not at starting-up), or when the determination result in step S103 is "NO" (i.e., trq≦th, the locking mechanism 80 is placed in the unlocked state), the operation proceeds to step S105 because the control operation for increasing the target turning angle is not required. In these cases, the correction coefficient "r" is set to be "1", and the control operations following step S106 are executed.

Figure 7:
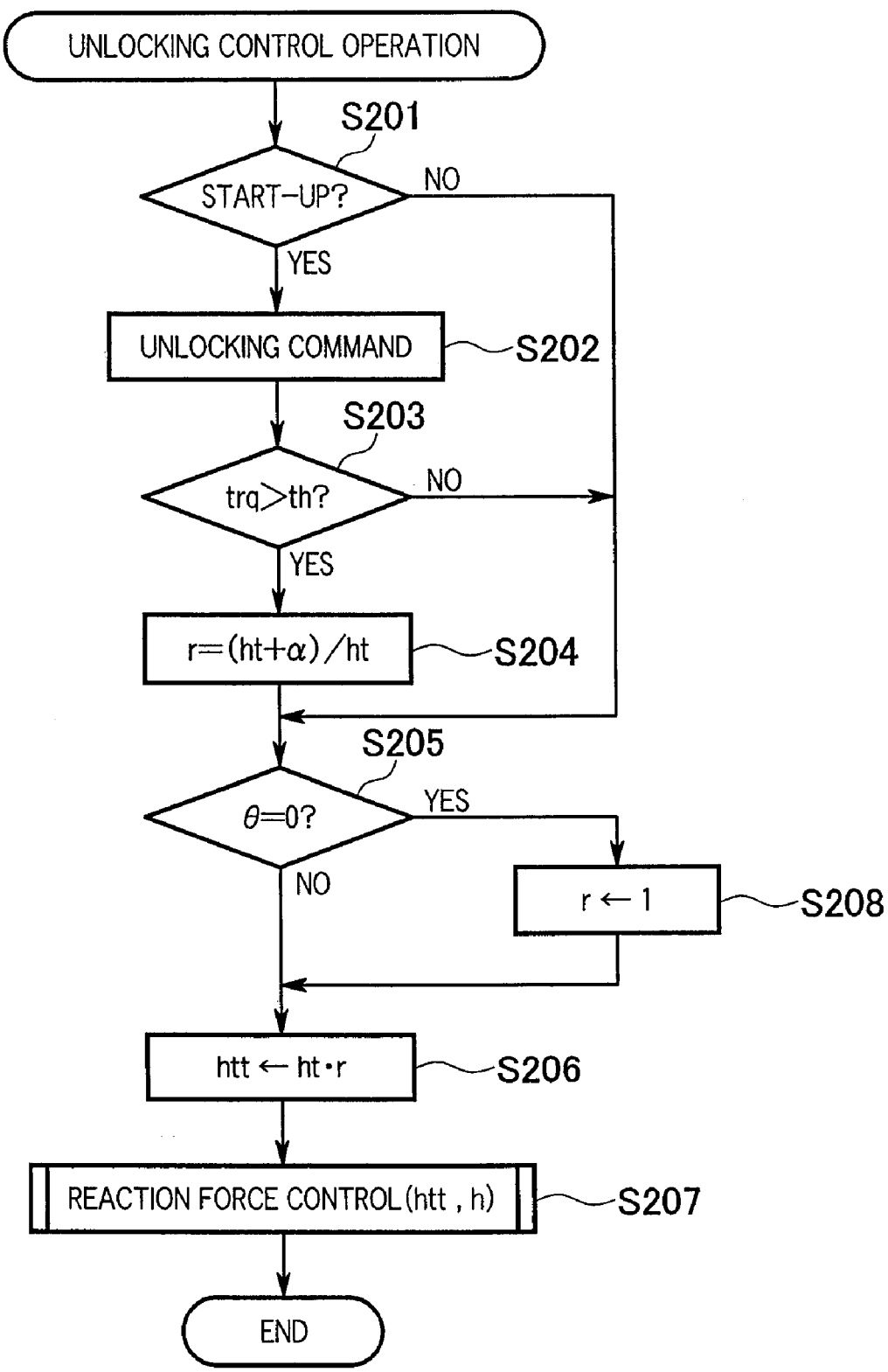
FIG. 7 is another example of a flowchart showing the unlocking operation of the steering apparatus for a vehicle according to the embodiment.

Next, the unlocking control operation, in which unlocking of the locking mechanism 80 is made easier by controlling the magnitude of the control parameter for the reaction force actuator 25 to be greater than a normal value, will be explained below with reference to the flowchart shown in FIG. 7. It should be noted that the control routine for the unlocking control operation illustrated in the flowchart shown in FIG. 7 is periodically repeated by the electronic control device 61.

In step S201, it is determined whether the system is at starting-up based on the output signal from the ignition switch 63.

When the determination result in step S201 is "YES" (i.e., the system is at starting-up), the operation proceeds to step S202, in which an unlocking command is sent out, and electric current is supplied to the solenoid 83 of locking mechanism 80 so that the solenoid 83 is excited.

Next, the operation proceeds to step S203, in which it is determined whether a steering torque "trq" measured by the steering torque sensor 29 is greater than a predetermined threshold "th" that is determined beforehand. In this embodiment, the execution of the operation in step S203 by the electronic control device 61 corresponds to the locking state detection unit.

When the determination result in step S203 is "YES" (i.e., trq>th), it is determined that the locking mechanism 80 has not been placed in the unlocked state, the operation proceeds to step S204, in which a correction coefficient "r" using Equation (3).

$$r = (ht + \alpha)/ht \qquad \text{Equation (3)}$$

In Equation (1), symbol "ht" is a normal target steering reaction force that is set when the locking mechanism 80 is placed in the unlocked state based on the vehicle speed signal output from the vehicle speed sensor 62, the actual turned angle signal output from the rack rod position sensor 42, and the turning angle command output from the turning control section 110 (i.e., a deviation signal between the target turning angle and the actual turned angle signal). Symbol "α", which is a predetermined value determined beforehand, indicates a steering reaction force that corresponds to an increased magnitude of the control parameter.

Next, the operation proceeds from step S204 to step S205, in which it is determined whether a steering angle θ of the steering wheel 21 measured by the steering angle sensor 23 is "0" (i.e., at a neutral position).

When the determination result in step S205 is "NO" (i.e., θ≠0), the operation proceeds to step S206, in which a corrected target steering reaction force "htt" is calculated using Equation (4).

$$htt = ht \cdot r \qquad \text{Equation (4)}$$

Next, the operation proceeds to step S207, in which electric current supplied to the reaction force motor 24 is controlled so that an actual steering torque "h" measured by the steering torque sensor 29 coincides with the corrected target steering reaction force "htt".

On the other hand, when the determination result in step S205 is "YES" (i.e., θ=0), the operation proceeds to step S208, in which the correction coefficient "r" is made to be "1", and then the operation proceeds to step S206.

In other words, when it is determined that the locking mechanism 80 has not been placed in the unlocked state from the locked state even though the solenoid 83 of the locking mechanism 80 is excited at starting-up of the system, a control operation is executed in which the target steering reaction force is made greater than a normal value. By this operation, the steering torque being applied to the first connection shaft 52 can be immediately reduced, and the torsional load created between the steering shaft 22 and the first connection shaft 52 can also be immediately reduced. As a result, the locking finger 84 can be disengaged from the teeth of the locking gear 81, and the locking mechanism 80 is placed in the unlocked state.

The control operation for increasing the target steering reaction force is maintained even after the locking mechanism 80 is placed in the unlocked state until the steering wheel 21 is placed at the neutral position while maintaining a steering ratio (i.e., the ratio of the control magnitude of the turning angle with respect to the steering angle) that is set at starting of the control operation for increasing the target steering reaction force. When the steering wheel 21 is placed at the neutral position, the control operation for increasing the target steering reaction force is ended, and a control operation under a normal steering ratio is resumed.

By this control operation, the locking mechanism 80 is reliably placed in the unlocked state at starting-up of the system, and a steering control operation in a manner of steer-by-wire can be stably carried out without imposing unusual sensations to the driver.

It should be noted that when the determination result in step S201 is "NO" (i.e., the system is not at starting-up), or when the determination result in step S203 is "NO" (i.e., trq≦th, the locking mechanism 80 is placed in the unlocked state), the operation proceeds to step S205 because the control operation for increasing the target steering reaction force is not required. In these cases, the correction coefficient "r" is set to be "1", and the control operations following step S206 are executed.

Other Embodiments

The present invention is not limited to the embodiments described above.

For example, the operation unit is not limited to the steering wheel 21, and may be a joystick.

In the above embodiments, the magnitude of the input operation applied to the steering wheel 21 (operation unit) is defined by the operation angle; however, the steering torque (indicating operation state) may be used as the magnitude of the input operation when controlling the turning actuator 38.

In the above embodiments, whether the locking element is placed in the locked state or unlocked state is determined based on the steering torque; however, the position of the push rod 88 of the solenoid 83, or the position of the locking finger 84 may be made measurable using a position sensor, and whether the locking element is placed in the locked state or unlocked state is determined based on the signal output from the position sensor.

Furthermore, when the locking mechanism 80 is not placed in the unlocked state from the locked state even though the solenoid 83 is excited, both the control operation for increasing the magnitude of the control parameter for the turning actuator 38 and the control operation for increasing the magnitude of the control parameter for the reaction force actuator 25 may be simultaneously executed.

Further additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A steering apparatus for a vehicle comprising:
an operation unit operated by a driver;
an input operation magnitude measuring unit measuring magnitude of an input operation applied to the operation unit;
a turning actuator turning steerable wheels;
a reaction force actuator applying a reaction force to the operation unit;
a turning actuator control unit controlling the turning actuator depending on the magnitude of the input operation measured by the operation magnitude measuring unit;
a reaction force actuator control unit controlling the reaction force actuator;
a planetary gear unit disposed between the operation unit and the turning actuator;
a locking element fixing, in a locked state, a component of the planetary gear unit so as to mechanically connect the operation unit and the steerable wheels, and making, in an unlocked state, the component rotatable so as to mechanically disconnect the operation unit from the steerable wheels;
a locking element operation unit operating the locking element;
a locking state detection unit detecting whether the locking element is placed in the locked state or in the unlocked state; and
a control unit executing at least one of a control operation for increasing magnitude of a control parameter for the turning actuator and a control operation for increasing magnitude of a control parameter for the reaction force actuator if it is determined by the locking state detection unit that the locking element is placed in the locked state even though the locking element operation unit is operated so as to place the locking element in the unlocked state from the locked state,
wherein when the magnitude of the control parameter for the turning actuator is increased, a ratio of the magnitude of the control parameter for the turning actuator with respect to the magnitude of the input operation is maintained constant until the operation unit returns to a neutral position.

2. A steering apparatus for a vehicle comprising:
an operation unit operated by a driver;
an input operation magnitude measuring unit measuring magnitude of an input operation applied to the operation unit;
a turning actuator turning steerable wheels;
a reaction force actuator applying a reaction force to the operation unit;
a turning actuator control unit controlling the turning actuator depending on the magnitude of the input operation measured by the operation magnitude measuring unit;
a reaction force actuator control unit controlling the reaction force actuator;
a planetary gear unit disposed between the operation unit and the turning actuator;
a locking element fixing, in a locked state, a component of the planetary gear unit so as to mechanically connect the operation unit and the steerable wheels, and making, in an unlocked state, the component rotatable so as to mechanically disconnect the operation unit from the steerable wheels;
a locking element operation unit operating the locking element;
a locking state detection unit detecting whether the locking element is placed in the locked state or in the unlocked state; and
a control unit executing at least one of a control operation for increasing magnitude of a control parameter for the turning actuator and a control operation for increasing magnitude of a control parameter for the reaction force actuator if it is determined by the locking state detection unit that the locking element is placed in the locked state even though the locking element operation unit is operated so as to place the locking element in the unlocked state from the locked state,
wherein when the magnitude of the control parameter for the reaction force actuator is increased, a ratio of the magnitude of the control parameter for the reaction force actuator with respect to the magnitude of the input operation is maintained constant until the operation unit returns to a neutral position.

3. A steering apparatus for a vehicle comprising:

an operation unit operated by a driver;

an input operation magnitude measuring unit measuring magnitude of an input operation applied to the operation unit;

a turning actuator turning steerable wheels;

a reaction force actuator applying a reaction force to the operation unit;

a turning actuator control unit controlling the turning actuator depending on the magnitude of the input operation measured by the operation magnitude measuring unit;

a reaction force actuator control unit controlling the reaction force actuator;

a planetary gear unit disposed between the operation unit and the turning actuator;

a locking element fixing, in a locked state, a component of the planetary gear unit so as to mechanically connect the operation unit and the steerable wheels, and making, in an unlocked state, the component rotatable so as to mechanically disconnect the operation unit from the steerable wheels;

a locking element operation unit operating the locking element;

a locking state detection unit detecting whether the locking element is placed in the locked state or in the unlocked state; and a control unit executing at least one of a control operation for increasing magnitude of a control parameter for the turning actuator and a control operation for increasing magnitude of a control parameter for the reaction force actuator if it is determined by the locking state detection unit that the locking element is placed in the locked state even though the locking element operation unit is operated so as to place the locking element in the unlocked state from the locked state, wherein when the magnitude of the control parameter for the turning actuator and the magnitude of the control parameter for the reaction force actuator are simultaneously increased, a ratio of the magnitude of the control parameter for the turning actuator with respect to the magnitude of the input operation and a ratio of the magnitude of the control parameter for the reaction force actuator with respect to the magnitude of the input operation are maintained constant until the operation unit returns to a neutral position.

* * * * *